United States Patent [19]
Takahashi

[11] Patent Number: 5,237,446
[45] Date of Patent: Aug. 17, 1993

[54] OPTICAL LOW-PASS FILTER

[75] Inventor: Susumu Takahashi, Kunitachi, Japan

[73] Assignee: Olympus Optical Co., Ltd., Tokyo, Japan

[21] Appl. No.: 536,958

[22] Filed: Jun. 12, 1990

Related U.S. Application Data

[63] Continuation of Ser. No. 188,541, Apr. 29, 1988, abandoned.

[30] Foreign Application Priority Data

Apr. 30, 1987 [JP] Japan ................... 62-107174

[51] Int. Cl.$^5$ .................. G02B 5/30; G02B 5/28; G02B 5/26; G02B 5/04
[52] U.S. Cl. ..................... 359/359; 359/490; 359/583; 359/589; 359/834; 358/44; 358/55
[58] Field of Search .............. 350/163, 166, 403, 404, 350/172, 173, 401, 402, 286; 358/43, 44, 55, 98; 359/359, 360, 485, 487, 490, 494, 495, 496, 497, 498, 583, 584, 629, 634, 833, 834, 836

[56] References Cited

U.S. PATENT DOCUMENTS

| | | | |
|---|---|---|---|
| 3,767,290 | 10/1973 | Lang et al. | 350/397 |
| 4,185,894 | 1/1980 | Hilton et al. | 350/166 |
| 4,291,945 | 9/1981 | Hayamizu | 350/286 |
| 4,539,584 | 9/1985 | Otake | 350/404 |
| 4,575,193 | 3/1986 | Greivenkamp, Jr. | 350/401 |
| 4,626,897 | 12/1986 | Sato et al. | 350/404 |
| 4,709,144 | 11/1987 | Vincent | 350/166 |
| 4,720,178 | 1/1988 | Nishioka et al. | 350/286 |
| 4,761,682 | 8/1988 | Asaida | 350/404 |
| 4,806,750 | 2/1989 | Vincent | 350/166 |
| 4,807,981 | 2/1989 | Takizawa et al. | 350/404 |
| 4,882,619 | 11/1989 | Hasegawa et al. | 350/402 |

FOREIGN PATENT DOCUMENTS 61-223802 10/1986 Japan .

OTHER PUBLICATIONS

M. Torfeh et al, "Coupling and Phase Matching Coefficients in a Magneto-Optical TE-TM Mode Converter", Physica 89B, (1977) pp. 255-259.

Primary Examiner—Bruce Y. Arnold
Assistant Examiner—R. D. Shafer
Attorney, Agent, or Firm—Cushman, Darby & Cushman

[57] ABSTRACT

An optical low-pass filter comprising at least two boundary surfaces arranged substantially parallel to each other which can split incident light into two components or reflect it and at least one of which has color dependency, in order to make it possible to be favorably used to an objective optical system for for endoscopes, to have wavelength dependency to response, and to minimize the generation of color moiré. The optical low-pass filter is constructed in the form of various shaped prisms and can also have two-dimensional filter characteristics.

18 Claims, 9 Drawing Sheets

| Cy<br>(B+G) | G | Cy<br>(B+G) | G | Cy<br>(B+G) |
|---|---|---|---|---|
| G | Ye<br>(R+G) | G | Ye<br>(R+G) | G |

| | INTENSITY | GAP |
|---|---|---|
| 0 | $(1-T)$ | 0 |
| 1 | $T^2$ | d |
| 2 | $T^2(1-T)$ | 2d |
| 3 | $T^2(1-T)^2$ | 3d |
| ⋮ | ⋮ | ⋮ |
| m | $T^2(1-T)^{m-1}$ | md |

OPTICAL LOW-PASS FILTER

This is a continuation of application Ser. No. 07/188,541, filed Apr. 29, 1988, which was abandoned upon the filing hereof.

BACKGROUND OF THE INVENTION a) Field of the Invention

The present invention relates to an optical low-pass filter used to eliminate moiré in television cameras, electronic cameras and fiberscopes provided with a solid state image pickup device.

b) Description of the Prior Art

In television cameras using a solid state image pickup device, a difficulty is encountered in which components of frequency higher than that (Nyquist rate) of half of the sampling frequency depending on the pitch of an array of pixel elements are included in a picture image, a false signal is generated with a resultant deterioration of the picture image. Such a false signal is generally termed "aliasing", "moiré", etc. and in particular, if the high frequency components, such as stripe patterns with a regular array, are included in the picture image, moiré will cause the picture image to be very unsightly.

Figure 1:
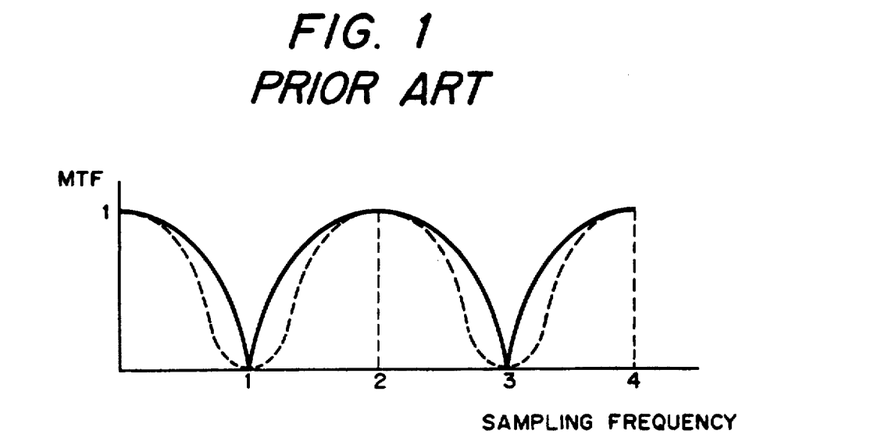
FIG. 1 is a graph showing filter characteristics of a conventional optical low-pass filter.

The high frequency components included in an object image must be previously eliminated in an objective optical system, namely, before reaching the solid state image pickup device. In the past, an optical low-pass filter employing birefringent elements has been used. This optical filter is usually composed of one or more artificial crystal. Characteristics of the filter using one crystal plate, that is, an absolute value MTF (modulation transfer function) of optical response function, describe a curve of cos $|\cos \theta|$ as drawn with a solid line in FIG. 1. Then, this curve causes the frequency of a first trap point (a point where the response is zero) to coincide with the Nyquist rate. The curve, however, rises up rapidly on the high frequency side from the Nyquist rate side, so that an effect of moiré elimination is weakened. For the moiré elimination effect to be lessened in the vicinity of the position of the Nyquist rate, a crystal plate is overlapped with another one having the same filter characteristics in such a manner that a ¼-wave plate is sandwiched between them. MTF represents a curve of $|\cos^2 \theta|$ as indicated with dotted line in FIG. 1 and its rising becomes relatively smooth in the vicinity of the trap point, with the result being that filter characteristics having an excellent moiré elimination effect are available.

Figure 2A:
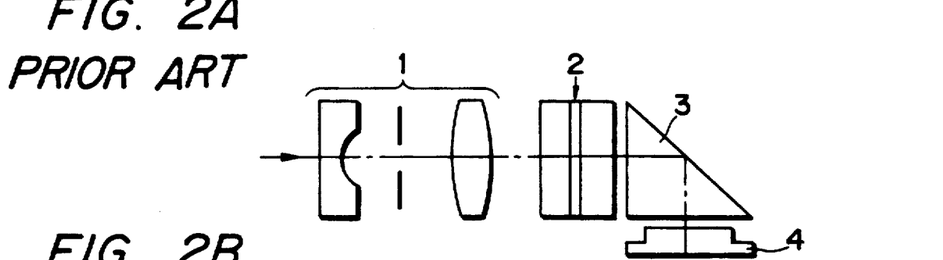
FIGS. 2A and 2B are views showing configuration examples of conventional optical low-pass filters different from each other.
Figure 2B:
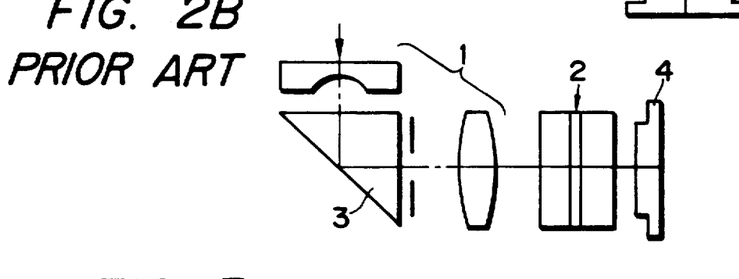

If, however, the filter consisting of such crystal plates is used in an electronic endoscope whose objective optical system and solid state image pickup device are incorporated in its tip portion, the objective optical system is liable to be lengthened due to the thickness of the crystal plate filter and, as a result, compaction of the tip portion of the endoscope has been considerably prevented. Specifically, the optical low-pass filter using one crystal plate as well as plural ones has a high rate of thickness bearing in the objective optical system of the endoscope and in particular, an objective optical system inclucing a prism in an optical path as shown in FIGS. 2A and 2B makes further compaction difficult. Also, in FIGS. 2A and 2B, reference numeral 1 designates an objective lens, 2 a crystal plate filter, 3 a right-angled triangle prism, and 4 a solid state image pickup device.

Here, as a countermeasure for solving the above difficulty, an optical filter described in Japanese Patent Preliminary Publication No. Sho 61-223802, for example, has been proposed. This optical low-pass filter is an optical element having a half mirror surface and a mirror surface provided parallel to each other in slightly spaced relation and arranged in an image forming optical path from an object to a solid state image pickup device so that the half mirror surface is provided on the outside of the element. Light coming from the object is obliquely incident on the half mirror surface and the mirror surface. In this configuration, light is reflected from the half mirror surface and light traversing the half mirror surface, reflected from the mirror surface slightly spaced, and traversing again the half mirror surface form a twin image of the object slightly spaced on a light receiving surface of the solid state image pickup device. The optical filter of the type, therefore, has the same function as in the case where a crystal plate forms the twin image of the object slightly spaced due to the ordinary ray and extraordinary ray and bears spatial frequency characteristics similar to the crystal plate.

However, in this optical filter, many ghost images are formed by multiple reflections occurring between the half mirror surface and the mirror surface in such a manner that a part of light reflected from the mirror surface is reflected from the half mirror surface, reflected light is reflected again from the mirror surface, a part of the light traverses the half mirror surface, the remainder is reflected from the half mirror surface and then from the mirror surface again, ... Such properties have a great effect on the response of the optical element and in this conventional example, the above respect has not been discussed completely, with resultant lack of practical use.

Figure 3:
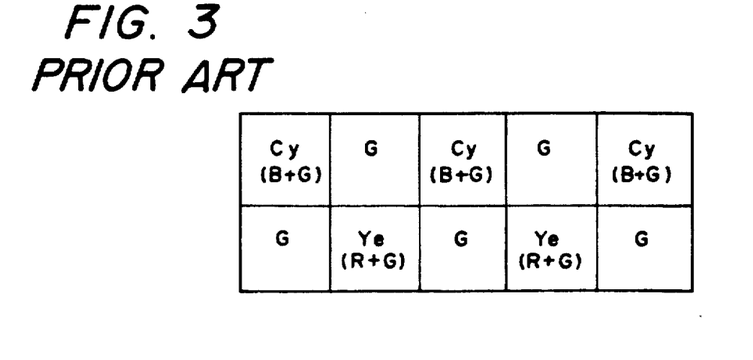
FIG. 3 is a view of a color array of a color mosaic filter.

Also, with coloring of a picture image, there has been a tendency for television cameras to use the system that a color coded mosaic filter is arranged on the image pickup device to form a color picture image from a signal read out. In order to form a picture image with a high degree of quality through an image pickup device with a preset number of pixel elements in particular, a system has been recently developed such that, instead of the color mosaic filter comprising conventional primaries uniformly distributed, a color mosaic filter composed of Cy (Cyan=Blue+Green), Green, and Ye (Yellow=Red+Green) as shown in FIG. 3 is employed to derive a G signal also used as a luminance signal from all pixel elements. That is, in this color mosaic filter, the luminance signal (G signal) is read out from all pixel elements, while B and R signals are individually read out from alternate pixel element. An optical low-pass filter most suitable for such a color mosaic filter has been proposed by U.S. Pat. No. 4,575,193. The feature of this optical low-pass filter is that its response has different wavelength dependency in accordance with wavelengths of light incident on the filter. Specifically, the frequency of the first trap point relating to G light is set to be twice that of B and R light and the filter has a wide band with respect to the G light and a narrow band to the B and R light. However, since this optical low-pass filter utilizes wavelength dependency of phase retardation of a wave plate, it has the property that the response relating to each color of R, G and B gradually changes in accordance with wavelengths. As a result, even in the wavelength band specified as a primary color as in each of R, G and B, the response will change unlimitedly in accordance with wavelengths. Accordingly, the optical low-pass filter of the type is not constructed so as to be optimized to various properties of a color mosaic filter using a complementary color system, that is this type of low-pass filter brings about color moiré and thus has performance insufficient to secure good picture quality in practical use.

SUMMARY OF THE INVENTION

A primary object of the present invention, therefore, is to provide an optical low-pass filter which allows an objective optical system to be compactly configured, has wavelength dependency as its response, and is constructed so as to be optimized to an image pickup device used.

Another object of the present invention is to provide an optical low-pass filter which is most suitable to an objective optical system for endoscopes and can minimize the generation of color moiré.

Still another object of the present invention is to provide an optical low-pass filter which has extremely excellent filter characteristics and can also bear two-dimensional filter characteristics.

The optical low-pass filter according to the present invention has at least two boundary surfaces arranged substantially parallel with each other to split or reflect a ray of incident light and at least one of these boundary surfaces is color dependent.

Also, the optical low-pass filter of the present invention can be shaped into a relatively thin form due to its multilayer thin film structure and is constructed so that, since wavelength dependency of response is due to wavelength per se, the characteristics in respective wavelength bands of R, G and B are not changed and the characteristics between respective wavelength bands are rapidly changed.

These and other objects as well as the features and advantages of the present invention will become apparent from the following detailed description of the preferred embodiments when taken in conjunction with the accompanying drawings.

DESCRIPTION OF THE PREFERRED EMBODIMENT

Referring to the embodiments shown in the drawings, the present invention will be described in detail below.

Figures 4, 5A, 5B:
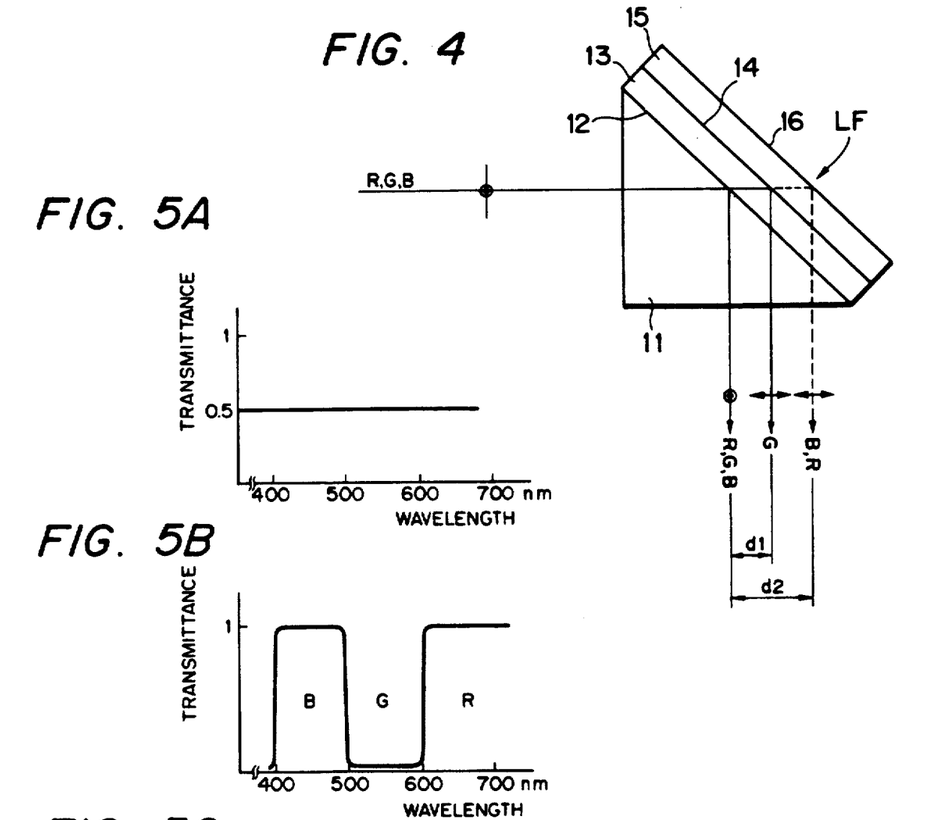
FIG. 4 is a sectional view of a first embodiment of an optical low-pass filter according to the present invention.
FIGS. 5A, 5B and 5C are views showing transmittance characteristics of respective reflecting films used in the first embodiment.
Figure 5C:
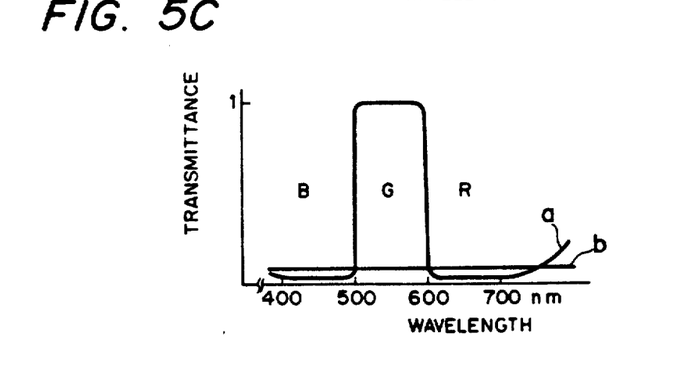

FIG. 4 shows a first embodiment, in which reference numeral 11 represents a right-angled triangle prism; 12 a first semitransparent film provided on an inclined surface of the prism 11 and having characteristics that, as shown in FIG. 5A, a ray component polarized in one direction is reflected and a ray component polarized in a direction perpendicular thereto is transmitted; 13 a first transmission layer laminated on the first semitransparent film 12; 14 a second semitransparent film which is a dichroic film, laminated on the first transmission layer 13 and having characteristics that, as shown in FIG. 5B, G light is reflected and B and R light is transmitted; 15 a second transmission layer laminated on the second semitransparent film 14; and 16 a third semitransparent film which is a dichroic film, laminated on the transmission layer 15 and having characteristics that, as indicated with a curve a in FIG. 5C, B and R light is reflected and the G light is transmitted. Also, a reflecting film reflecting nearly all of light rays as a curve b depicted in FIG. 5C may be provided instead of the third semitransparent film 16. Further, a totally reflecting surface will do just as well. The thickness of the first transmission layer 13 is designed so that a distance $d_1$ between R, G and B light reflected from the first semitransparent film 12 and the G light reflected from the second semitransparent film 14 is ½ of a distance between pixel elements of a solid state image pickup device and the sum of thicknesses of the first transmission layer 13 and the second transmission layer 15 is set so that a distance $d_2$ between the R, G and B light reflected from the first semitransparent film 12 and the B and R light reflected from the third semitransparent film 16 is equivalent to the distance between the pixel elements of the solid state image pickup device. These distances $d_1$ and $d_2$ individually range from several microns to several tens of microns and if the distance is more than several microns, no problem arises because coloring of reflecting light is not caused by interference under ordinary white color light supply illumination and natural light. Also, the first and second transmission layers 13 and 15 comprise adhesive layers, thin glass plates, vacuum evaporation material films and resin films.

Figure 6:
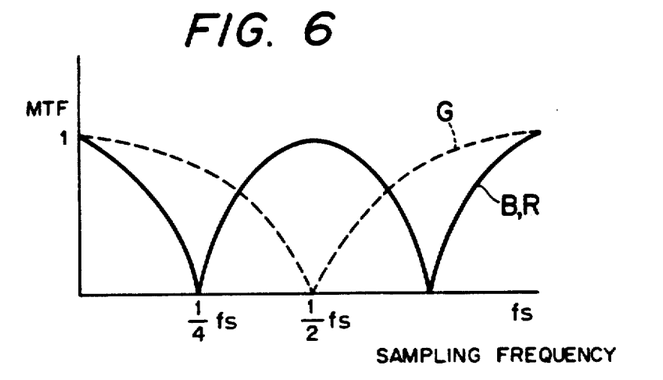
FIG. 6 is a diagram showing filter characteristics of the first embodiment.

This embodiment is formed as described above, and thus a ray of G light is split into two spots spaced from each other by the distance $d_1$ (½ of a pitch between the pixel elements), while a ray of B and R light is split into two spots spaced from each other by the distance $d_2$ (a pitch between the pixel elements). Therefore, as shown in FIG. 6, the entire filter characteristic of the first embodiment allows the first trap point to be set at (½)fs (where fs is the sampling frequency of the solid state image pickup device) with respect to the B and R light and at (¼)fs in regard to the G light, so that high frequency components of a color signal, namely, the B and R light can be maintained without losing the frequency band of the G light, namely, a luminance signal.

Figure 7:
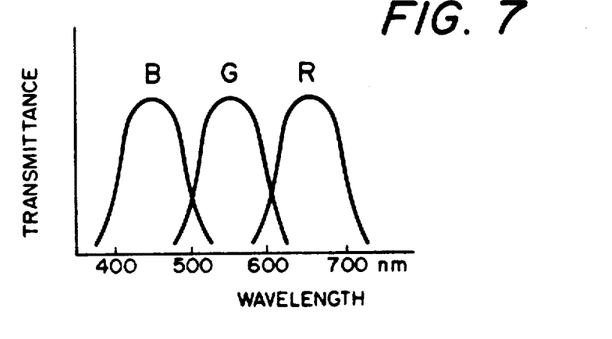
FIG. 7 is a diagram showing transmittance characteristics of a complementary color mosaic filter.

The first embodiment, which has been explained as to the response, exhibits a multilayer thin film structure having a small thickness in the range from several microns to several tens of microns, with the result that the thickness offers no substantial problem and makes it possible to configure compactly an objective optical system. Further, since wavelength dependency of the response is derived from the difference of the reflection factor caused by various wavelengths of the dichroic films constituting the second and third semitransparent films, the difference of response by the wavelengths is little in each wavelength band of R, G and B and is large between different wavelength bands as in R and G, G and B, and B and R. Accordingly, the response is optimized to the characteristics of a complementary mozaic filter having, for example, such properties as shown in FIG. 7 and, in other words, can minimize the generation of color moiré. Also, the filtering characteristics of the film are changed, that is, the wavelengths and their bandwidths are changed in relation to respective wavelength bands of R, G and B of the color mosaic filter and thereby the filter characteristics can arbitrarily be varied. Further, the light reflected from the second semitransparent film is not reflected by the first semitransparent film and the light reflected from the third semitransparent film is not reflected by the first and second semitransparent films, so that multiple reflections are not caused.

Figure 8:
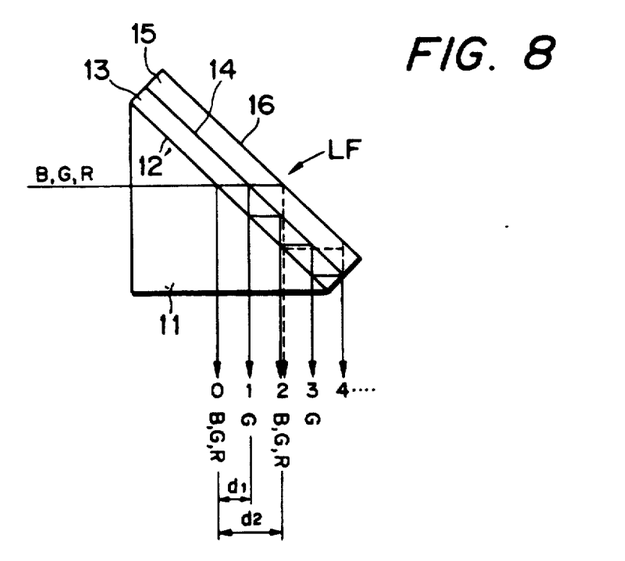
FIG. 8 is a sectional view showing a second embodiment of the present invention.
Figure 9:
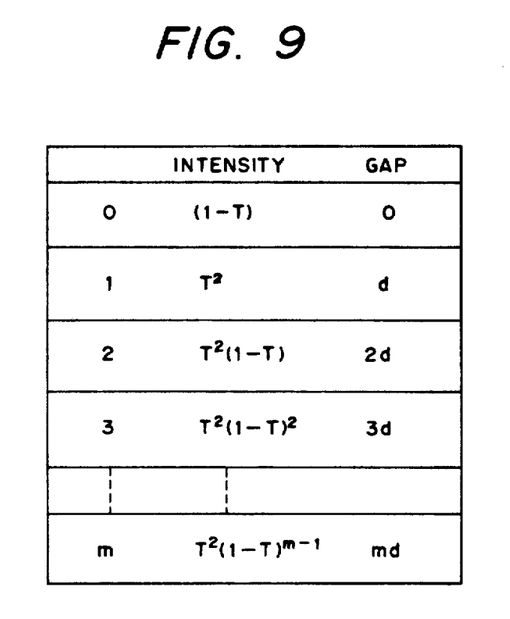
FIGS. 9 and 10 are a table showing intensity of each point image of the second embodiment and graphs showing intensity distribution thereof, respectively.
Figure 10:
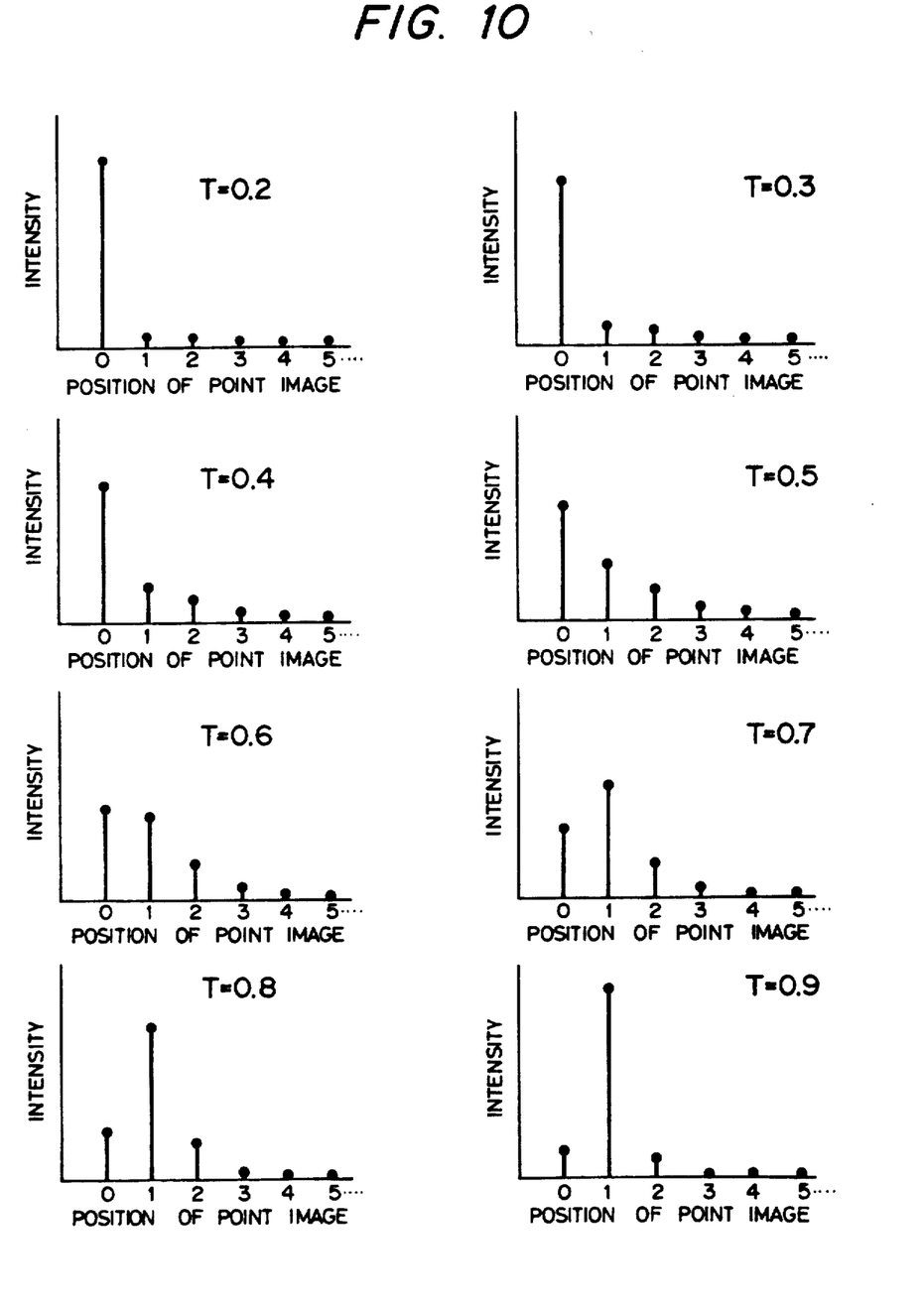

FIG. 8 shows a second embodiment, which has the same structure as the first embodiment, except that in the second embodiment a first semitransparent film 12' has no polarized characteristic. This embodiment requires multiple reflections to be performed between plural films. First, a ray of white light incident on the first semitransparent film 12' is split so that one ray component is reflected and another ray component is transmitted. Then, reflected light reaches an image receiving surface of the solid state image pickup device as a ray of white light (B, G and R) of number 0 shown in FIG. 8. On the other hand, the G light of the ray traversing the first semitransparent film 12' is multiply reflected between the first and second semitransparent films 12' and 14 after reflected from the second semitransparent film 14, and rays of numbers 1, 2, 3, ... shown in FIG. 8 reach the image receiving surface. In this case, respective rays are spaced at regular intervals by the distance $d_1$ and form point images with their amounts of light reduced. Also, after the B and R light traverses the second semitransparent film 14 and is reflected from the third semitransparent film 16, it is multiply reflected between the first and third semitransparent films 12' and 16, and rays of numbers 2, 4, ... shown in FIG. 8 arrive at the image receiving surface. In this case, respective rays are spaced at regular intervals of the distance $d_2$ and form point images with their amounts of light reduced. Thus, when the transmittance of the first semitransparent film 12' is taken as T and the reflectance as $(1-T)$, the intensity of each point image is as shown in the table of FIG. 9 and each point spread function is graphed in FIG. 10. Here, filtering characteristics derived from Fourier transform of the point spread function including the case of the multiple reflections are determined as follows:

$$F(K) = \int_{-\infty}^{\infty} \left\{ (1-T)\delta(x) + T^2 \sum_{m=1}^{\infty} \delta(x - md) \cdot (1-T)^{m-1} \right\} e^{-j2\pi kx} dx$$

$$= (1-T) + T^2 \sum_{m=1}^{\infty} (1-T)^{m-1} \cdot e^{-j2\pi k(md)}$$

$$= (1-T) + T^2 \sum_{m=1}^{\infty} (1-T)^{m-1} \cdot \cos 2\pi k(md)$$

$$|F(K)| = |(1-T) + T^2 \sum_{m=1}^{\infty} (1-T)^{m-1} \cdot \cos 2\pi k(md)|$$

Figure 11:
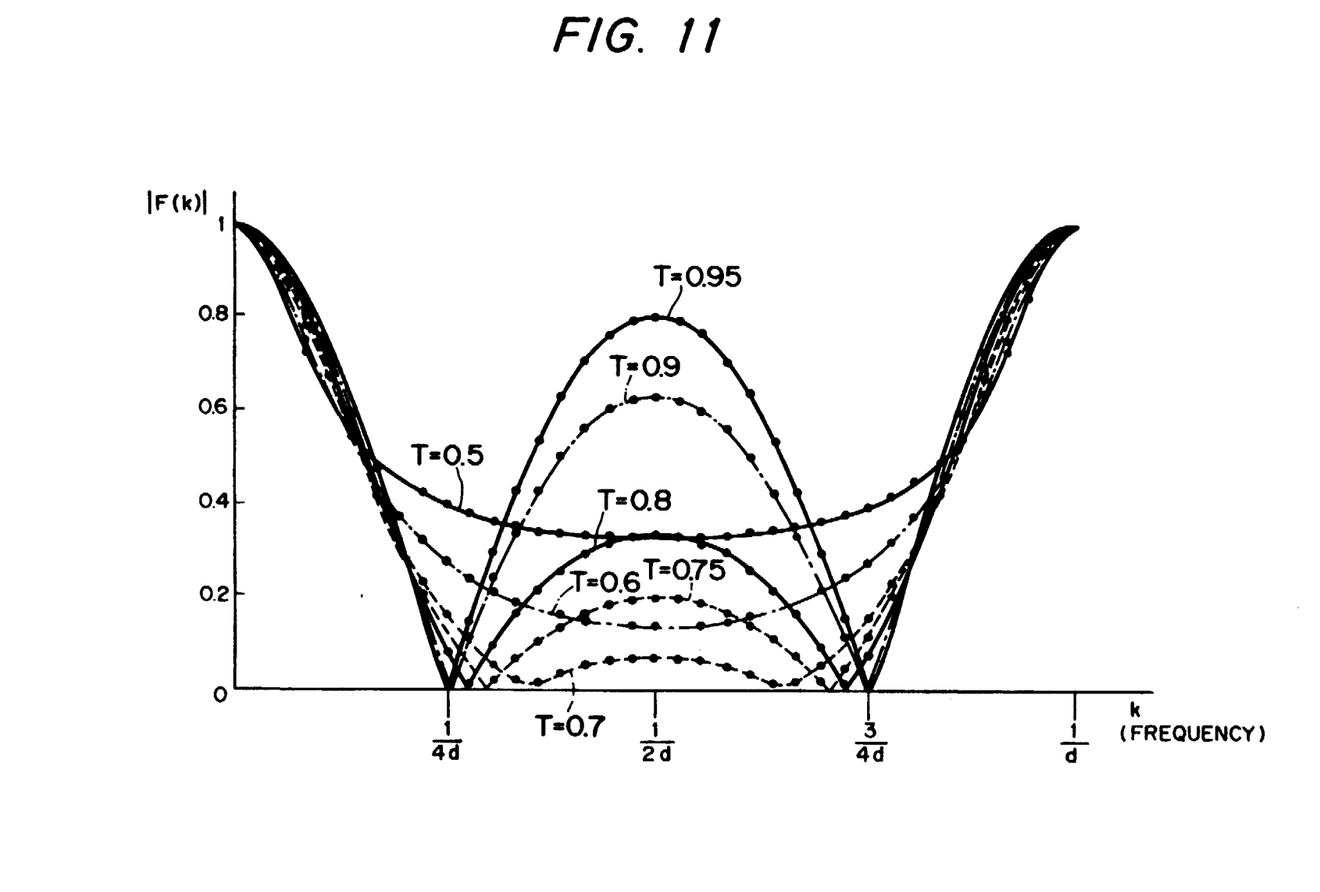
FIG. 11 is a graph showing filtering characteristics of the second embodiment.

Now, when T is taken as a parameter and the value of k (frequency) is plotted along the abscissa, the characteristics are represented by the graph shown in FIG. 11. It is evident from FIG. 11 that viability for the optical low-pass filter lies in the range of $T = 0.55 \sim 0.95$. In particular, good performance is exhibited in the range of $T = 0.6 \sim 0.8$. In this range, frequency response is held between 1/4d and 3/4d of the frequency and the filter has height performance which is superior to the characteristics of the crystal plate filter composed of one crystal plate. This, as opposed to the first embodiment shown in FIG. 4, exhibit characteristics materialized by adopting the multiple reflections.

Figure 12:
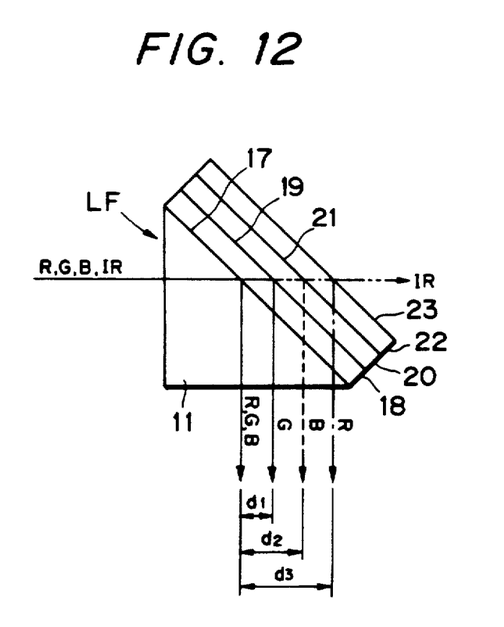
FIGS. 12 and 13 are sectional views showing a third embodiment and a fourth embodiment of the present invention, respectively.

FIG. 12 shows a third embodiment, which comprises a first semitransparent film 17 splitting a ray of white light into two components and transmitting IR (infrared) light; a first transmission layer 18, a second semitransparent film 19 reflecting the G light and transmitting B, R and IR light; a second transmission layer 20; a third semitransparent film 21 reflecting the B light and transmitting R and IR light; a third transmission layer 22; and a fourth semitransparent film 23 reflecting R light and transmitting the IR light, laminated in order on the inclined surface of the right-angled triangle prism 11 in which ray components of G, B and R light are spaced at distances $d_1$, $d_2$ and $d_3$ different from each other, respectively. This aspect is adapted for the case where spaces among G, B and R are different from each other with respect to the color array of the mosaic filter provided on the solid state image pickup device. The third embodiment has the advantage that light detrimental to the solid state image pickup device is eliminated because all of the semitransparent films 17, 19, 21 and 23 have an IR light transmission characteristic. Also, the characteristics of the film are changed with respect to the wavelength characteristics of the mosaic filter, namely, the wavelength and bandwidth are varied or the transmission reflectance of light of each color is changed and thereby various characteristics of the low-pass filter can arbitrarily be obtained. For the first semitransparent filter 17, the semitransparent film having such polarization characteristics as in the first embodiment shown in FIG. 4 may also be used and the semitransparent film not having such polarization characteristics as in the second embodiment shown in FIG. 8 will do. The response in such instances, however, becomes the same as in the first and second embodiments.

Figure 13:
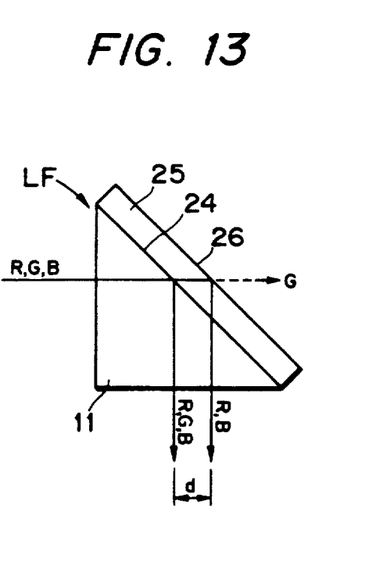

FIG. 13 depicts a fourth embodiment, which comprises a first semitransparent film 24 splitting a ray of white light, a transmission layer 25, and a second semitransparent film 26 reflecting the R and B light and transmitting the G light, laminated in order on the inclined surface of the right-angled triangle prism 11, and which has no response with respect to the G light, but to the R and B light only. This aspect is adapted for the case where the number of pixel elements of the solid state image is largely increased. Also, for the first semitransparent film 24, the semitransparent film having such polarization characteristics as in the first embodiment shown in FIG. 4 may also be employed and the semitransparent film not having such polarization characteristics as in the second embodiment shown in FIG. 8 will do. However, the response in such cases becomes the same as in the first and second embodiments.

Figure 14A:
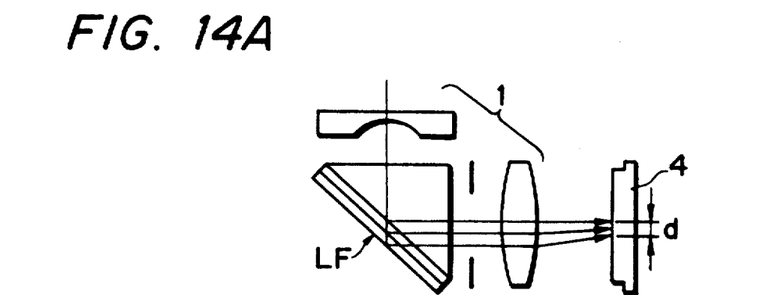
FIGS. 14A and 14B and FIG. 15 are views of practical configurations of the first through fourth embodiments.
Figure 14B:
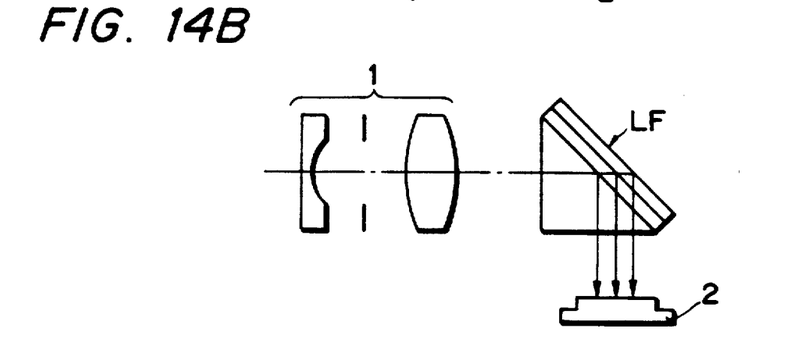
Figure 15:
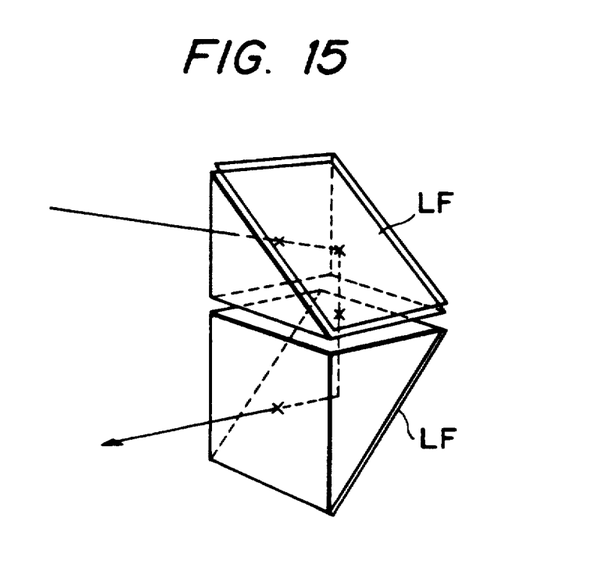

The optical low-pass filters LF of the first through fourth embodiments are practically arranged as shown in FIGS. 14A and 14B. However, where the optical low-pass filter is not arranged between a lens system and an image pickup surface, but within the lens system as shown in FIG. 14A, it is necessary that the thickness of the low-pass filter is selected so that proper deviation d is obtained on the image pickup surface in consideration of magnification of the optical system. Also, if two optical low-pass filters LF are arranged as shown in FIG. 15, it is possible to bring about two-dimensional low-pass filter characteristics.

Figure 16:
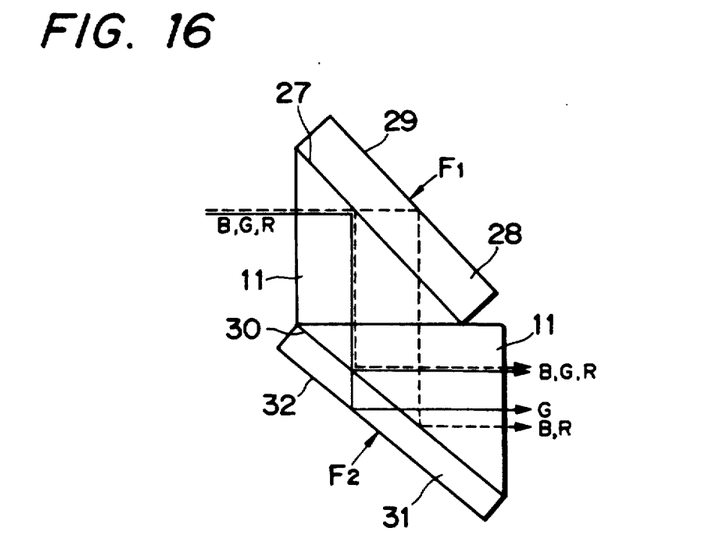
FIG. 16 is a sectional view showing a fifth embodiment of the present invention.
Figures 17A, 17B:
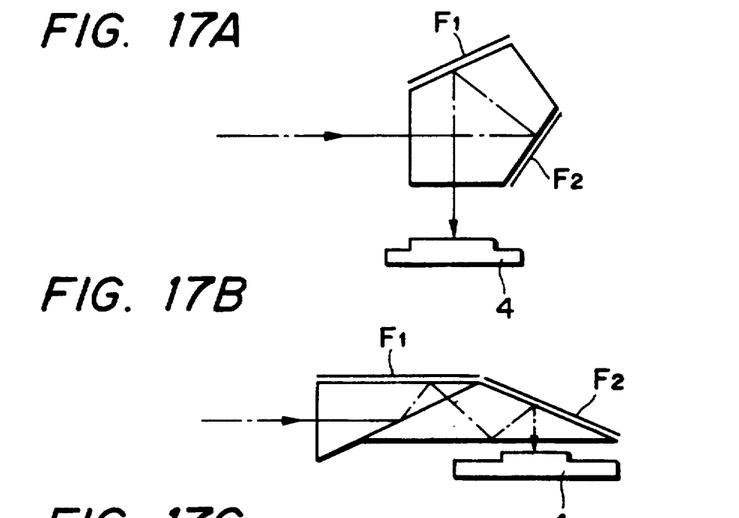
FIGS. 17A, 17B and 17C are views of practical configurations different from each other, of the fifth embodiment.
Figure 17C:
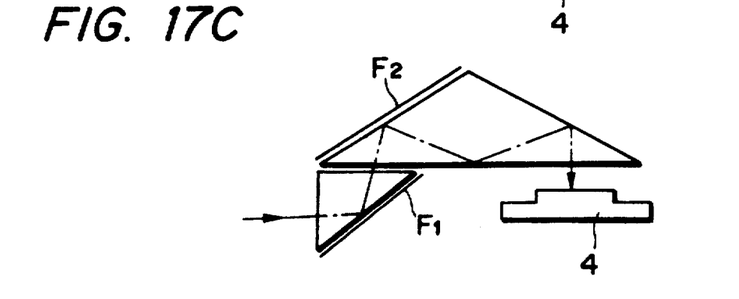

FIG. 16 shows a fifth embodiment, which comprises a first filter $F_1$ composed of a semitransparent film 27 reflecting the G light and splitting a ray of B and R light into two components, a transmission layer 28, and a reflecting film 29 reflecting the B and R light, laminated in order on the inclined surface of the right-angled triangle prism 11; and a second filter $F_2$, arranged opposite to each other, composed of a semitransparent film 30 reflecting the B and R light and splitting a ray of G light into two components, a transmission layer 31, and a reflecting film 32 reflecting the G light, laminated in order on the inclined surface of the right-angled triangle prism 11. Also, if the semitransparent films 27 and 30 are formed so as to have the polarization characteristics and bear the transmittance and the reflectance of 50% each, no multiple reflections are brought about. On the other hand, if the semitransparent films 27 and 30 are made so as not to have the polarization characteristics, the multiple reflections are generated and each ratio of the transmittance and the reflectance is selected to thereby be able to secure favorable response. This embodiment may also be configured as shown in FIGS. 17A, 17B and 17C.

Figure 18A:
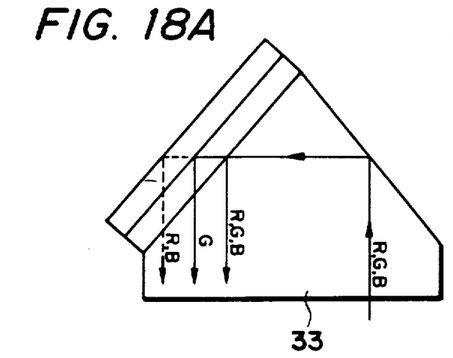
FIGS. 18A and 18B are sectional views showing modification examples of the first and second embodiments and the fifth embodiment, respectively.
Figure 18B:
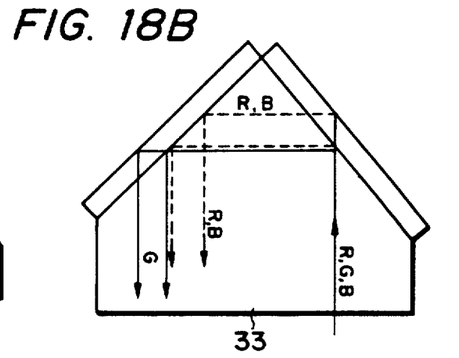

FIG. 18A shows a modification example of the first embodiment in FIG. 4 and the second embodiment in FIG. 8 and FIG. 18B depicts a modification example of the fifth embodiment in FIG. 16, each of which comprises a filter portion provided on one side or both sides of a roof surface of a roof (Dach) prism 33.

Figure 19:
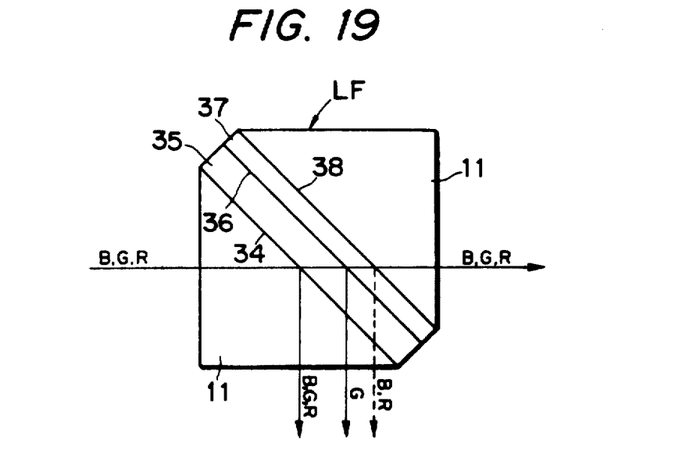
FIG. 19 is a sectional view showing a sixth embodiment of the present invention.
Figure 20:
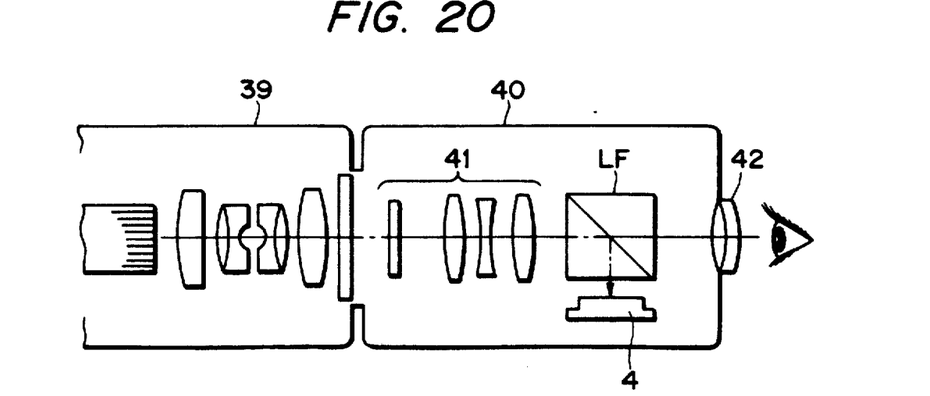
FIG. 20 is a view of a practical configuration of the sixth embodiment.

FIG. 19 shows a sixth embodiment, which comprises a first semitransparent film 34 splitting a ray of white light into two components, a first transmission layer 35; a second semitransparent film 36 splitting a ray of G light into two components and transmitting the B and R light; a second transmission layer 37, and a third semitransparent film 38 splitting a ray of B and R light into two components and transmitting the G light, laminated in order between a pair of right-angled triangle prisms 11, 11. If the first semitransparent film 34 is constructed so as to have the polarization characteristics, no multiple reflections are brought about, so that this embodiment has the low-pass filter characteristics on the lower side of FIG. 19 and has no low-pass filter characteristics on the right hand side (for instance, the finder side) of FIG. 19. On the other hand, where the first semitransparent film 34 is formed so as not to have the polarization characteristics, the multiple reflections are generated, with the result that the low-pass filter characteristics are borne on both the lower and right sides. The optical low-pass filter LF of this embodiment, as shown in FIG. 20, is disposed between an image pickup lens unit 41 and an eyepiece 42 of a television camera 40 mounted to a fiberscope eyepiece portion 39 from the outside in use and is adapted to eliminate moiré occurring between an ordered array of the fiber end of the exit end face of a fiber bundle and an ordered array of pixel elements on the image receiving surface of the solid state image pickup device 4.

As mentioned above, the optical low-pass filter according to the present invention has important advantages in practical use that the objective optical system can compactly be configured to be suitable for the endoscope, the response has wavelength dependency and is optimized, and the generation of color moiré can be minimized. Furthermore, it has also other advantages that use of the technique of multiple reflections allows the filter characteristics to be further improved and when plural filters are employed, two-dimensional filter characteristics are available.

What is claimed is:

1. An image pickup system including an optical low-pass filter unit comprising:

a first filter including a first right-angled triangle prism, a first semitransparent film provided on an inclined surface of said first triangle prism which reflects G light included in incident light and a part of B and R light included in said incident light and transmits remaining light, a first transmission layer laminated on said first semitransparent film, and a first reflecting film provided on said first transmission layer which reflects the remaining part of incident B and R light included in said incident light;

a second filter including a second right-angled triangle prism whose incident plane is overlapped with an exit plane of said first right-angled triangle prism, a second semitransparent film provided on an inclined surface of said second triangle prism which reflects incident B and R light and a part of G light, reflected from said first semi-transparent and reflecting films, and transmits the remaining part of G light, a second transmission layer laminated on said second semitransparent film, and a second reflecting film provided on said second transmission layer which reflects the remaining part of G light, transmitted from said second semitransparent film; and an image pickup device adapted to receive, on a single light receiving surface, all components of R, G and B light reflected from said second filter.

2. An image pickup system according to claim 11, wherein said first and second semitransparent films reflect one of two polarized light components, which have directions of vibrations normal to one another, of the incident light and transmit the other of said two polarized light components.

3. An image pickup system having an optical low-pass filter unit comprising:

a first filter including a first semitransparent film provided on a first reflecting surface of a pentagonal prism which reflects G light included in incident light and a part of B and R light included in said incident light and transmits remaining light, a first transmission layer laminated on said first semitransparent film, and a first reflecting film provided on said first transmission layer which reflects the remaining part of incident B and R light included in said incident light;

a second filter including a second semitransparent film provided on a second reflecting surface of said pentagonal prism which reflects incident B and R light and a part of G light, reflected from said first semi-transparent and reflecting films, and transmits the remaining part of G light, a second transmission layer laminated on said second semitransparent film, and a second reflecting film provided on said second transmission layer which reflects the remaining part of G light, transmitted from said second semitransparent film; and an image pickup device adapted to receive, on a single light-receiving surface, all components of R, G and B light reflected from said second filter.

4. An image pickup system having an optical low-pass filter unit comprising:

a right-angled triangle prism;

a triangle prism having an inclined surface joined to that of said right-angled triangle prism;

a first filter including a first semitransparent film provided on a surface that is one surface of said right-angled triangle prism and is normal to an incident plane of said right-angled triangle prism which reflects G light included in incident light and a part of B and R light included in said incident light and transmits remaining light, a first transmission layer laminated on said first semitransparent film, and a first reflecting film provided on said first transmission layer which reflects the remaining part of incident B and R light included in said incident light;

a second filter including a second semitransparent film provided on the other inclined surface of said triangle prism which reflects incident B and R light and a part of G light, reflected from said first semitransparent and reflecting films, and transmits the remaining part of G light, a second transmission layer laminated on said second semitransparent film, and a second reflecting film provided on said second transmission layer which reflects the remaining part of G light, transmitted from said second semitransparent film; and an image pickup device adapted to receive, on a single light-receiving surface, all components of R, G and B light reflected from said second filter.

5. An image pickup system having an optical low-pass filter unit comprising:

a right-angled triangle prism;

a triangle prism having a bottom surface overlapped partially with a surface normal to an incident plane of said right-angled triangle prism;

a first filter including a first semitransparent film provided on an inclined surface of said right-angled triangle prism which reflects G light included in incident light and a part of B and R light included in said incident light and transmits remaining light, a first transmission layer laminated on said first semitransparent film, and a first reflecting film provided on said first transmission layer which reflects the remaining part of incident B and R light included in said incident light;

a second filter including a second semitransparent film provided on one inclined surface of said triangle prism which reflects incident B and R light and a part of G light, reflected from said first semitransparent and reflecting films, and transmits the remaining part of G light, a second transmission layer laminated on said second semitransparent film and a second reflecting film provided on said second transmission layer which reflects the remaining part of G light, transmitted from said second semitransparent film; and an image pickup device adapted to receive, on a single light-receiving surface, all components of R, G and B light reflected from said second filter.

6. An image pickup system having an optical low-pass filter unit comprising:

a roof prism;

a first semitransparent film provided on one inclined surface of said roof prism which reflects a part of R, G and B light included in incident light and transmits the remaining part of R, G and B light included in said incident light;

a first transmission layer laminated on said first semitransparent film;

a second semitransparent film provided on said first transmission layer which reflects the remaining part of G light included in said incident light, transmitted from said first semi-transparent film;

a second transmission layer laminated on said second semitransparent film;

a third semitransparent film provided on said second transmission layer which reflects the remaining part of B and R light included in said incident light, transmitted from said first and second semi-transparent films; and an image pickup device adapted to receive, on a single light-receiving surface, all components of R, G and B light emanating from said roof prism.

7. An image pickup system having an optical low-pass filter unit comprising:

a roof prism;

a first semitransparent film provided on one inclined surface of said roof prism which reflects a part of R, G and B light included in incident light and transmits the remaining part of R, G and B light included in said incident light;

a first transmission layer laminated on said first semitransparent film;

a second semitransparent film provided on said first transmission layer which reflects the remaining part of G light included in the incident light, transmitted from said first semi-transparent film, and transmits the remaining part of B and R light included in said incident light, transmitted from said first semi-transparent film;

a second transmission layer laminated on said second semitransparent film;

a reflecting film provided on said second transmission layer which reflects the remaining part of B and R light included in said incident light, transmitted from said first and second semi-transparent films; and an image pickup device adapted to receive, on a single light-receiving surface, all components of R, G and B light emanating from said roof prism.

8. An image pickup system having an optical low-pass filter unit comprising:

a roof prism;

a first semitransparent film provided on one inclined surface of said roof prism which reflects G light inclined in incident light and a part of B and R light and transmits the remaining part of light included in the incident light;

a first transmission layer laminated on said first semi-transparent film;

a first reflecting film provide on said first transmission layer which reflects the remaining part of incident B and R light, transmitted from said first semitransparent film;

a second semitransparent film provided on the other inclined surface of said roof prism which reflects incident B and R light and a part of G light, reflected from said first semitransparent and reflecting film, and transmits the remaining part of G light;

a second transmission layer laminated on said second semitransparent film;

a second reflecting film provided on said second transmission layer which reflects the remaining part of G light, transmitted from said second semi-transparent film; and an image pickup device adapted to receive, on a single light-receiving surface, all components of R, G and B light emanating from said roof prism.

9. An image pickup system having an optical low-pass filter unit comprising:

a first right-angled triangle prism;

a first semitransparent film provided on an inclined surface of said first right-angled triangle prism which reflects one part of incident white light and transmits the remaining part of said incident white light;

a first transmission layer laminated on said first semi-transparent film;

a second semitransparent film provided on said first transmission layer which reflects a part of incident G light and transmits the remaining part of incident G light and B and R light;

a second transmission layer laminated on said second semitransparent film;

a third semitransparent film provided on said second transmission layer which reflects a part of incident B and R light and transits the remaining part of incident G, B and R light;

a second right-angled triangle prism whose inclined surface is overlapped with said third semitransparent film; and an image pickup device adapted to receive, on a single light-receiving surface, all components R, G and B light emanating from said first right-angled triangle prism.

10. An image pickup system according to claim 9, wherein said first semitransparent film is constructed to reflect one of two polarized light components, which have directions of vibration normal to one another, of incident light and transmit the other component.

11. An image pickup system provided with an optical low-pass filter unit, comprising:

an objective lens forming an image of an object;

an image pickup device receiving the object image formed by said objective lens; and p1 an optical low--pass filter arranged in an optical path through which light coming from the object reaches said image pickup device, said optical low-pas filter limiting a spatial frequency response of said objective lens, said optical low-pass filter including a first interface which is a dichroic reflecting surface for transmitting light of at least one of three primary colors included in incident light and for reflecting light of remaining primary colors, a second interface, arranged substantially parallel to said first interface, for reflecting light of at least one of the three primary colors of the light transmitted by said first interface, and a semi-transmissive surface arranged substantially parallel to said first interface on the side of incidence of said first interface, said semi-transmissive surface having a transmittance characteristic being that part of the incident light is transmitted and remaining light is reflected;

said optical low-pass filter being arranged so that the first interface and said second interface intersect obliquely with an optical axis of the optical path along which the light travels from the object to said image pickup device;

said semi-transmissive surface, said first interface and said second interface being arranged so that the light reflected from said semi-transmissive surface, said first interface and said second interface is in a substantially parallel state; and light reflected from said first and second interfaces being incident together on a single light-receiving surface of said image pickup device;

wherein said semi-transmissive surface has a transmittance characteristic being that one of two polarized light components having planes of vibration normal to one another is reflected and the other is transmitted.

12. An image pickup system according to claim 11, wherein said semi-transmissive surface has a transmittance characteristic being that part of visible light components included in the incident light is reflected and remaining visible light components and an infrared light component are transmitted, said first interface having a reflectance characteristic being that a first primary color light component is reflected and second and third primary color light components and said infrared light component are transmitted, said second interface having a reflectance characteristic being that said second primary color light component is reflected and said third primary color light component and said infrared light component are transmitted, and said optical low-pass filter further includes a third interface having a transmittance characteristic such that said third primary color light component transmitted by said second interface is reflected and said infrared light component is transmitted, said third interface being substantially parallel to said second interface.

13. An image pickup system according to any one of claims 11 or 12, wherein said semi-transmissive surface is provided on an inclined surface of a triangle prism, said first interface being disposed on said semi-transmissive surface so that a first transmission layer is sandwiched between said first interface and said semi-transmissive surface, and said second interface being disposed on said first interface so that a second transmission layer is sandwiched between said second interface and said first interface.

14. An image pickup system according to claim 13, wherein said first interface has a reflectance characteristic such that a first primary color light component is reflected and second and third primary light components are transmitted, and said second interface having a reflectance characteristic such that said second and third primary color light components are reflected.

15. An image pickup system according to claim 11 wherein said first interface has a reflectance characteristic such that a first primary color light component is reflected and second and third primary color light components are transmitted, and said second interface has a reflectance characteristic such that said second and third primary color light components are reflected.

16. An image pickup system according to claim 11, wherein the value of transmittance of said semi-transmissive surface is in a range from 0.55 to 0.95.

17. An image pickup system according to claim 11, wherein said second interface has a transmittance characteristic that first and second primary color light components are reflected and a third primary color light component is transmitted.

18. An image pickup system according to claim 11, wherein said first interface has a reflectance characteristic such that a first primary color light component is reflected and second and third primary color light components are transmitted, and said second interface has a reflectance characteristic such that said first primary color light component is transmitted, part of said second and third primary color light components is reflected, and another part of said second and third primary color light component is transmitted.

* * * * *

UNITED STATES PATENT AND TRADEMARK OFFICE
CERTIFICATE OF CORRECTION

PATENT NO. : 5,237,446
DATED : AUGUST 17, 1993
INVENTOR(S) : TAKAHASHI

It is certified that error appears in the above-indentified patent and that said Letters Patent is hereby corrected as shown below:

Col. 9, line 7, change "claim 11" to --claim 1--.

Col. 12, line 5, please delete "p1", and "an" should start a new paragraph.

Col. 13, line 4, after "primary", please insert --color--.

Signed and Sealed this

Fourth Day of July, 1995

Attest:

BRUCE LEHMAN

Attesting Officer     Commissioner of Patents and Trademarks